March 7, 1967  T. E. WEICHSELBAUM ET AL  3,308,303
TRANSDUCER SYSTEM EMPLOYING ELECTRO-OPTICAL MEANS
Filed June 28, 1963

INVENTORS
THEODORE E. WEICHSELBAUM
ANTON J. HORN
BY
ATTORNEY

United States Patent Office 3,308,303
Patented Mar. 7, 1967

3,308,303
TRANSDUCER SYSTEM EMPLOYING
ELECTRO-OPTICAL MEANS
Theodore E. Weichselbaum, Normandy, and Anton J. Horn, Creve Coeur, Mo., assignors, by mesne assignments, to Brunswick Corporation, a corporation of Delaware
Filed June 28, 1963. Ser. No. 292,210
11 Claims. (Cl. 250—231)

This invention relates in general to certain new and useful improvements in transducer systems and, more particularly, to an improved type of transducer system employing electro-optical means.

Various techniques have heretofore been developed for translating scientific measurements and similar variable parameters in technological devices into an electrical impulse or signal which can then be fed into some suitable read-out device. Where any degree of precision is required, it is ordinarily considered highly desirable that the transducer system have linear characteristics.

One type of transducer system which is frequently used in scientific instrumentation and in similar applications comprises a photoelectric cell which is connected through suitable circuitry to some form of meter or read-out device and is located in optical juxtaposition to a light source, the intensity of which is varied in some way by the physical phenomenon being measured or sensed. Much of the literature dealing with this type of transducer system proceeds on the assumption that the photoelectric cell is inherently a linear device and that a transducer system embodying a photoelectric cell will precisely and accurately respond in direct proportion to variations in intensity of the light source.

In recent years, it has been recognized, however, that photoelectric cells do not respond linearly to variations in intensity of illumination. In fact, the output vs. illumination curve will be different under various load conditions, with the result that a whole series of different curves will be generated with various degrees of nonlinearity depending upon the load into which the cell operates. This is clearly exemplified by a series of curves appearing in Bulletin SV–1, "Selenium Photocells," published by Vac-Tec Corporation, St. Louis, Missouri.

Consequently, if a photoelectric cell is to be utilized in a specific circuit employing a meter or similar read-out device, special precautions must be taken to design a circuit such that the cell is working into a load which does not cause operation along a non-linear portion of the output vs. illumination curve corresponding to such load. This is not always possible since meter resistance or a function of meter sensitivity i.e. a 500 micro-ampere meter has a much lower resistance than a 25 micro-ampere meter. Thus, the circuit designer, when given a source of light and a required linearity, must choose a cell of sufficient area to develop the current necessary to drive the meter. Very often, this would lead to a photoelectric cell of much larger size than would be consistent with the space limitations and cost limitations under which the transducer system must be designed. Therefore, the light source must be changed or, if this is not possible, a lens system to gather more available light must be employed and these latter expedients have concomitant disadvantages.

Photoelectric cells are also subject to fatigue, that is to say, a change in output current with time following each initial exposure to light. However, as the load resistance is increased, the effect of fatigue decreases and, above certain load resistances, a negative fatigue effect actually occurs. On the other hand, the output current of a photoelectric cell will decrease slightly as the temperature of the cell increases. Therefore, if a circuit can be designed so that the load resistance is high enough, the effect of temperature drift can be off-set by the fatigue effect. In general practice, however, load resistances high enough to achieve this compensation are much too high for good linearity so the net effect is undesirable. Accordingly, in devices where any appreciable degree of precision is required, rather elaborate design precautions must be taken to avoid temperature drift and fatigue effect.

It is, therefore, the primary object of the present invention to provide an electro-optical transducer system having unique linearity of repsonse so as to be capable of measuring various types of physical phenomenon in a highly accurate and uniformly reproducible manner.

It is another object of the present invention to provide a transducer system of the type stated which is simple and economical in construction and substantially free of inaccuracies resulting from temperature drift and fatigue effect.

It is also an object of the present invention to provide a transducer system of the type stated which can be readily adapted to a wide variety of different measuring and sensing applications with an extremely high degree of accuracy and precision.

With the above and other objects in view, our invention resides in the novel features of form, construction, arrangement, and combination of parts presently described and pointed out in the claims.

Figure 1:
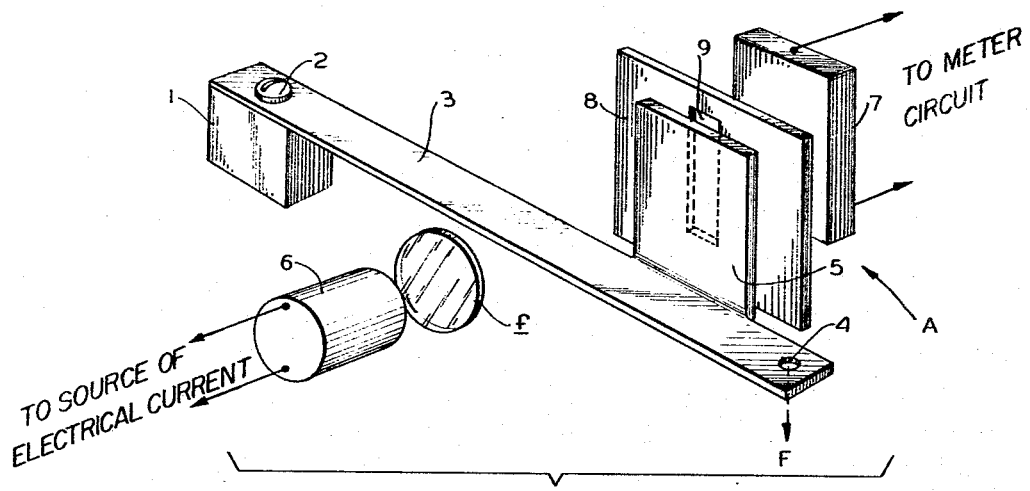
FIG. 1 is a schematic perspective view of a transducer system constructed in accordance with and embodying the present invention.

Generally speaking, the transducer system of the present invention comprises an opague light-screen, such as a blade, plate or similar element which is interposed between a photoelectric cell and a constant-intensity lightsource, so that movement of said light-screen will expose more or less of the area of the photoelectric cell. The cell will then transmit a current, the amperage of which is directly proportional to the area exposed to light from the lamp, and this response is precisely linear. The photo-electric cell is preferably connected across potentiometers or the like for balancing the electrical circuit and thereby calibrating the device. The circuit may also include a micro-ammeter or other suitable read-out device.

Referring now in more detail and by reference characters to the drawings which illustrate practical embodiments of the present invention, A designates a transducer system comprising a suitable fixed support member 1 and secured to the upper face thereof by means of a screw 2 is a thin flexible blade 3 made preferably of spring steel and provided at its outer or free end with an aperture 4 by which it may be mechanically connected to the remote element or device being measured. Inwardly from its free end, the blade 3 is integrally provided with an upstanding opaque light-source or plate 5. Located on one side of the plate 5 is a constant intensity light-source 6, such as, for example, a low voltage electric light bulb. Located on the opposite side of the plate 5 is a photoelectric cell 7 and interposed between the plate 5 and cell 7 is a stationary plate 8 having an elongated slit or aperture 9 so positioned as to be completely screened from the light source when the blade 3 is in normal or inflexed position.

When a force F is applied to the outer end of the blade 3, the latter will flex, carrying the plate 5 downwardly and exposing some of the area of the cell 7 to light from the light-source 6. As the force increases, the plate 5 will move downwardly progressively exposing more and more of the area of the photocell 7 to light. It should be noted, in this connection, that, although the components of the transducer system A are shown in vertical relationship and the blade 3 is adapted to flex upwardly or downwardly, these positions and directions are merely illustrative and may readily be changed depending upon the requirements of some particular application or use. Similarly, the force F can be applied by a conventional scale pan (not shown) if the transducer system A is utilized for weighing purposes, or can be applied by a thermometric device if the transducer system A is utilized for temperature measurements or monitoring. In fact, there is no limitation as to the application or usage from which the force F may be derived and it has been found by actual test that the transducer system A will respond delicately, precisely and in direct proportion to the force F. In other words, if the force F is a linear function, the output of the transducer system will be precisely linear. Moreover, it has been found that the range of response can be either very broad or very narrow as the requirements of the particular use may demand and there are no practical limitations as to load resistance. In fact, by selecting a rather high load resistance, it is possible to achieve a fatigue effect which will balance out the temperature drift of the system. The problems inherent in such selection and balancing are familiar to the skilled circuit designer and can easily be solved by reference to fatigue and temperature-drift curves which are ordinarily supplied by the manufacturers of photoelectric cells. Even if such curves are not available, they can be developed by conventional methods.

Figure 2:
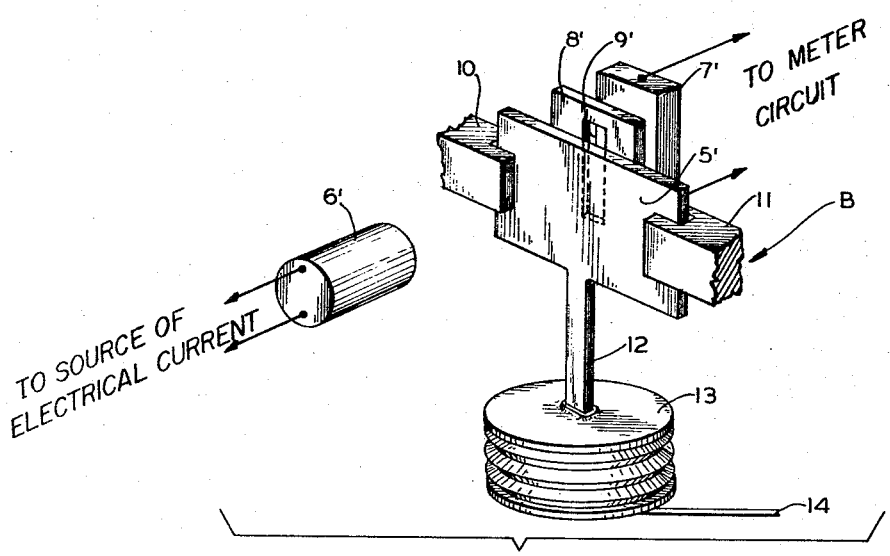
FIG. 2 is a schematic perspective view illustrating a modified form of transducer system embodying the present invention.

It is also possible to provide a modified form of transducer system B, as shown schematically in FIG. 2, which comprises an opaque plate 5', a light source 6', a photoelectric cell 7', and a stationary plate 8' having an aperture or slit 9', all substantially similar to the previously described plate 5, light source 6, photoelectric cell 7, stationary plate 8, and slit 9 of the transducer system A. The plate 5', however, is mounted between slide-guides 10, 11, which are adapted to support it for vertical reciprocating movement in as frictionless a manner as possible. The lower portion of the plate 5' is integrally or otherwise rigidly connected to an actuating bar 12 which is, in turn, connected to, and supported at its lower end by, a conventional bellows 13, the latter being operatively connected by a pipe or tube 14 to some source of pressure (not shown) which is to be monitored or measured.

As the bellows 13 expands or contracts responsive to pressure-variations, the opaque plate 5' will move upwardly and downwardly responsive thereto and expose correspondingly more or less of the area of the photoelectric cell 7' to a beam of light from the constant intensity light source 6'. Since pressure monitoring usually requires the capability of both plus and minus control in reference to a median or zero point, the upper edge of the opaque plate 5' is shown as being located midway between the upper and lower limits of the slit 9'. It will, of course, be obvious that different geometrical relationships and configurations may be employed without departing from the spirit and scope of the present invention.

Figure 3:
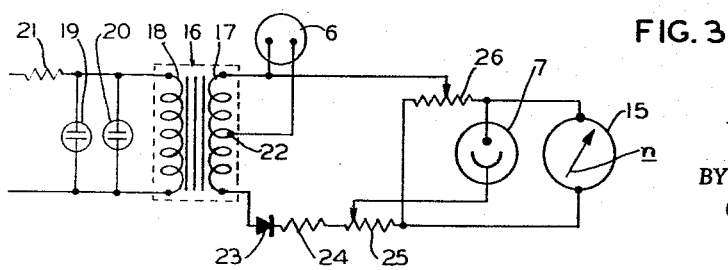
FIG. 3 is a schematic view of one form of electric circuit which may be utilized in conjunction with and as a part of the present invention.

By way of illustration and not by way of limitation, FIG. 3 shows a particular electrical circuit by which the photoelectric cell 7, or for that matter the photoelectric cell 7', may be connected to a microammeter 15. This circuit also includes a transformer 16 having a secondary coil 17 and a primary coil 18 and which is, in turn, connected to a suitable source of electrical current (not shown). Connected in parallel across the primary coil 18 in the manner as shown in FIG. 3 is a pair of neon tubes 19, 20, and connected in series with the primary coil 18 is a resistor 21. The light source 6 is electrically connected to one terminal of the secondary coil 17 and to a center tap 22 on the secondary coil 17. By reason of the operation of the neon tubes 19, 20, the voltage output of the secondary coil 17 is maintained substantially constant and, therefore, the light source 6 will have a substantially constant intensity. The photoelectric cell 7 is preferably a selenium cell or silicon cell, and, preferably, though not necessarily, a red filter f may be used in conjunction with the light source 6 for passing only rays of monochromatic red light of constant intensity which will, in turn, energize the photoelectric cell 7. The output of the secondary coil 17 is also connected through a diode 23, resistor 24 and two potentiometers 25, 26, across the photoelectric cell 7 and the microammeter 15 as shown in FIG. 3.

Thus, when the circuit is connected to any suitable source of electrical current, the primary coil 18 will be energized and will, in turn, induce the voltage in the secondary coil 17. The potentiometers 25, 26, are adjusted so that the indicating needle n rests at the desired initial scale mark which, of course, may be the zero point or null point of the phenomenon being measured or monitored.

It should be understood that changes and modifications in the form, construction, arrangement, and combination of the several parts of the transducer systems, may be made and substituted for those herein shown and described without departing from the nature and principle of our invention.

Having thus described our invention, what we claim and desire to secure by Letters Patent is:

1. A measuring device having a transducer system for measuring a variable characteristic in a physical phenomenon, comprising: means for translating said characteristic into mechanical movement; a source of electrical potential; regulating means connected to said potential source, a potential output of said regulating means being substantially constant; a light source having an intensity dependent on the electrical potential impressed thereacross; means connecting said light source to the output of said regulating means to produce substantially constant intensity light regardless of fluctuations in the potential from said potential source; a photoelectric cell located in optical alignment with said light source so that the substantially constant intensity light from the light source will impinge thereon, said cell having an electrical output proportional to the area thereof exposed to substantially constant intensity light; means interposed between the light source and the cell, including an opaque plate having an aperture therein which exposes the cell area therethrough, and an opaque element movably mounted adjacent the aperture and being operatively responsive to variations in said mechanical movement to expose substantially uniform amounts of cell area for linear variations in said mechanical movement; a meter having a reading directly proportional to the current flowing therethrough; and circuit means connecting said meter and the electrical output of said cell in circuit with said regulating means, said meter having a reading substantially linearly proportional to said mechanical movement.

2. A transducer system according to claim 1 wherein the means interposed between the light source and the photoelectric cell is an opaque plate.

3. A measuring device having a transducer system according to claim 1 and in which said meter comprises a read-out device.

4. The system of claim 1 wherein said light source has a monochromatic light intensity.

5. The system of claim 1 wherein said cell converts impinging light energy into a current having an amperage proportional to the area of the cell exposed to said light.

6. The system of claim 1 wherein the means interposed between the light source and the cell is an opaque plate carried by an element that can reciprocate to expose more and less of the area of the cell.

7. The measuring device of claim 1 wherein said circuit means includes a potentiometer network whereby the circuit may be balanced to set the meter to some selected initial reading.

8. The measuring device of claim 7 including a second potentiometer network for setting the meter to a selected initial reading.

9. The measuring device of claim 1 wherein said regulating means includes resistance means and constant voltage drop means connected across said potential source, the substantially constant electrical output of said regulating means being obtained across said constant voltage drop means.

10. The measuring device of claim 1 wherein said opaque element includes an arm having first and second portions and a portion spaced therebetween which covers a part of said aperture, means coupling the motive force of said characteristic to the first portion, and means pivoting the second portion at a location spaced from said aperture, causing the spaced portion to expose substantially uniform amounts of the aperture for linear variations in said characteristic.

11. The system of claim 1 wherein said means interposed between the light source and the cell has a rest position in which some of the area of said cell is exposed to said light when the characteristic of the phenomenon is not varying.

References Cited by the Examiner

UNITED STATES PATENTS

| | | | |
|---|---|---|---|
| 2,635,461 | 4/1953 | Groth et al. | 73—434 |
| 2,753,754 | 7/1956 | Le Clair | 250—232 X |
| 2,922,891 | 1/1960 | Turner et al. | 250—205 |
| 3,037,123 | 5/1962 | Lewis et al. | 250—217 |
| 3,102,227 | 8/1963 | De Gier | 250—209 X |

RALPH G. NILSON, *Primary Examiner.*

WALTER STOLWEIN, *Examiner.*